(12) United States Patent
Kelly

(10) Patent No.: US 9,139,997 B2
(45) Date of Patent: Sep. 22, 2015

(54) GULLY ARRANGEMENT

(71) Applicant: Frank Kelly, Droitwich (GB)

(72) Inventor: Frank Kelly, Droitwich (GB)

(73) Assignee: BLUEWATER DESIGN ASSOCIATES LIMITED (GB)

(*) Notice: Subject to any disclaimer, the term of this patent is extended or adjusted under 35 U.S.C. 154(b) by 0 days.

(21) Appl. No.: 13/998,923

(22) Filed: Dec. 23, 2013

(65) Prior Publication Data

US 2014/0109993 A1   Apr. 24, 2014

Related U.S. Application Data

(63) Continuation-in-part of application No. 13/261,353, filed on Aug. 27, 2012, now abandoned.

(51) Int. Cl.
*E03F 5/042* (2006.01)

(52) U.S. Cl.
CPC ........... *E03F 5/042* (2013.01); *Y10T 137/7358* (2015.04)

(58) Field of Classification Search
CPC . E03F 5/042; E03F 5/41; E03F 5/00–5/0411; E03F 2005/0412–2005/0418; E03F 5/046; E03F 5/06; E03F 2005/061–2005/068; Y10T 137/27; Y10T 137/265; Y10T 137/2534; Y10T 137/2536; Y10T 137/2539; Y10T 137/6988; Y10T 137/7358; Y10T 137/7485; Y10T 137/7898; Y10T 137/79; Y10T 137/7901; Y10T 137/7902; Y10T 137/7903

USPC ........... 137/362, 409, 448, 527–527.8, 87.02, 137/118.01, 101.25, 101.27, 101.29; 405/36, 39–41; 116/228, 229

See application file for complete search history.

(56) References Cited

U.S. PATENT DOCUMENTS

| 330,148 | A | * | 11/1885 | Paine | ........................ | 137/247.17 |
| 597,822 | A | * | 1/1898 | Martin | ........................ | 137/409 |
| 1,187,683 | A | * | 6/1916 | Vernon | ........................ | 137/527 |
| 2,317,278 | A | * | 4/1943 | Larson | ........................ | 137/247.21 |
| 2,517,195 | A | * | 8/1950 | Gaspar | ........................ | 137/398 |
| 3,478,882 | A | * | 11/1969 | Hornemann | ........................ | 210/104 |
| 6,318,404 | B2 | * | 11/2001 | Coscarella | ........................ | 137/409 |
| 8,578,961 | B2 | * | 11/2013 | Coscarella | ........................ | 137/448 |
| 2009/0200216 | A1 | * | 8/2009 | Robinson et al. | ........................ | 210/85 |
| 2010/0078083 | A1 | * | 4/2010 | Coscarella | ........................ | 137/527 |
| 2012/0024400 | A1 | * | 2/2012 | Smit | ........................ | 137/409 |

OTHER PUBLICATIONS

Molding Solutions, Rubber Engineering Guide, taken from the website, www.molders.com on Nov. 16, 2014.*

* cited by examiner

*Primary Examiner* — John K Fristoe, Jr.
*Assistant Examiner* — Craig J Price
(74) *Attorney, Agent, or Firm* — Ira S. Dorman

(57) ABSTRACT

A gully arrangement comprises a housing (1) having an inlet (17) at an upper end thereof, a reservoir (3) in a lower region thereof, and a conduit system (5, 7) forming a trap at a side of the housing. A valve (19) is provided in an upper region of the housing and adapted to close the inlet in the event liquid in the housing rises substantially to the level of the valve. The conduit system comprises an upper conduit (5) communicating with the housing at a level below the inlet, the upper conduit being closed at the housing by a removable stopper (20), and a lower conduit (7) exiting the housing at a lower level than the upper conduit and extending in an upwardly inclined direction to communicate with the upper conduit.

14 Claims, 3 Drawing Sheets

GULLY ARRANGEMENT

CROSS-REFERENCE TO RELATED APPLICATION

This application is a continuation-in-part of U.S. application Ser. No. 13/261,353, filed Aug. 27, 2012, which in turn is the application for entry of the United States National Stage of PCT/EP2010/069485, filed Dec. 13, 2010.

BACKGROUND OF THE INVENTION (1) Field of the Invention

This invention relates to a gully arrangement which may form, for example, part of a drainage system.

(2) Description of Related Art

Conventional drainage systems, for example provided as a part of the infrastructure in residential and commercial areas, receive waste water, sewage and the like from residential premises and convey the waste to a sewage works or the like by way of a sewer which generally runs beneath a road. The drainage system includes a plurality of gullies which are conventionally provided at the side of a road or in another convenient location to receive rain water and transfer the same to the sewer. Such gullies are generally referred to as road gullies.

Under normal circumstances, such conventional drainage systems function adequately, but in the event of a flood there is often excess surface water which requires to drain away by way of the road gullies as well as increased flow through the sewer of the drainage system. If the flow through the sewer increases to a rate that the sewer is unable to accommodate, then backflow occurs and waste from the sewer flows back through the gully which may further increase the amount of surface water, but additionally may allow the escape of untreated sewage, which is not only inconvenient but also potentially harmful.

If a conventional drainage system is unable to cope in flood conditions, then it would be preferable to control the point or points in the drainage system where excess water and/or untreated sewage can escape, ideally at a location remote from residential or commercial areas.

BRIEF DESCRIPTION OF THE INVENTION

It is therefore an object of the present invention to provide a gully, such as a road gully, which overcomes, or at least ameliorates, the likelihood of backflow under flood conditions.

According to the present invention there is provided a gully arrangement comprising: a housing having an inlet at an upper end thereof, a reservoir in a lower region thereof, and a conduit system forming a trap at a side of the housing; and a valve provided in an upper region of the housing and adapted to close the inlet in the event liquid in the housing rises substantially to the level of the valve, wherein the conduit system comprises an upper conduit communicating with the housing at a level below the inlet, the upper conduit being closed at the housing by a removable stopper, and a lower conduit exiting the housing at a lower level than the upper conduit and extending in an upwardly inclined direction to communicate with the upper conduit.

The conduit system may be provided in a lateral protrusion of the housing.

The upper conduit may extend in a downwardly inclined direction from the housing.

The housing may be provided with a continuous inwardly-extending lip for sealing with the valve. The valve may be adapted to seal with a lower surface of the lip. A peripheral region of the valve may engage with the lip.

The valve may comprise a flap valve pivotably mounted along one edge thereof.

The specific gravity of the valve may be less than 1. That is, the valve may be made of a material having a specific gravity less than 1 and/or the valve may be provided with a float, for example along a free edge thereof.

The valve may be provided with reinforcing ribs, for example extending in two transverse directions.

In an open configuration of the inlet, the valve may be received in a recess provided in a wall of the housing.

BRIEF DESCRIPTION OF THE SEVERAL VIEWS OF THE DRAWING

For a better understanding of the present invention and to show more clearly how it may be carried into effect reference will now be made, by way of example, to the accompanying drawings in which.

DETAILED DESCRIPTION OF THE INVENTION

Figure 1:
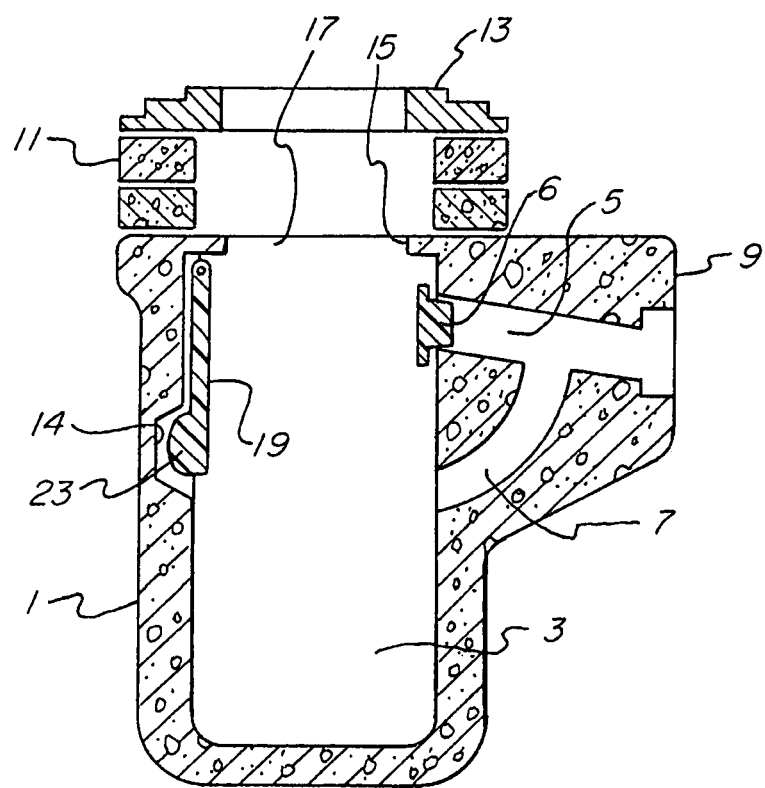
FIG. 1 is a cross-sectional view of one embodiment of a gully according to the present invention in a first configuration.
Figure 2:
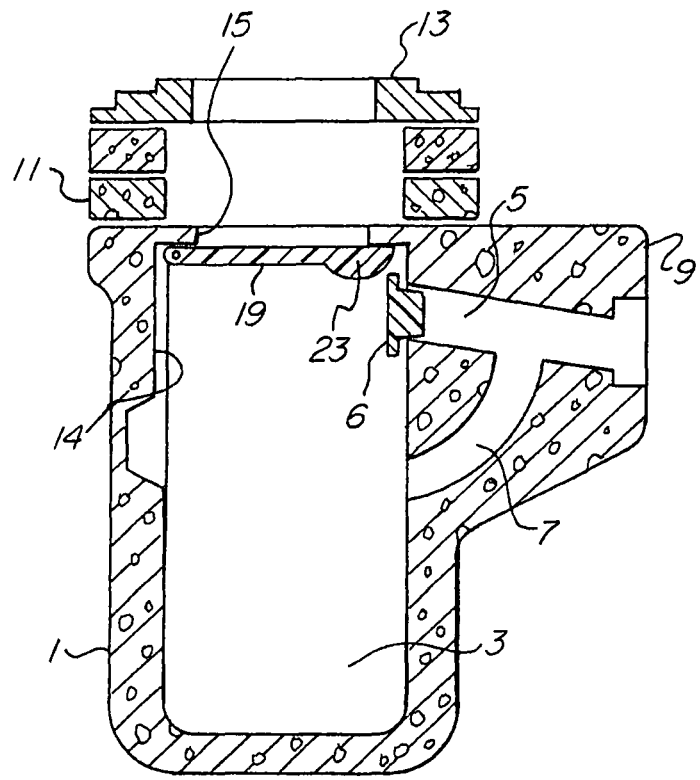
FIG. 2 is a cross-sectional view of the gully of FIG. 1 in a second configuration.

The gully shown in FIGS. 1 and 2 is similar to a conventional road gully, but includes non-return valve means to prevent backflow in the event of flood conditions.

The illustrated gully according to the present invention includes a housing 1 which is conveniently of substantially square or rectangular configuration. The housing is formed with a reservoir 3 in a lower region thereof and with a conduit system at a side of the housing. An upper outlet conduit 5 is normally closed by a removable stopper 6, shown diagrammatically in FIGS. 1 and 2, while a lower outlet conduit 7 exits the housing at a lower level than the upper conduit 5 and extends in an upwardly inclined direction to communicate with the upper conduit 5, in the illustrated embodiment, in a lateral protrusion 9 of the housing 1, the removable stopper 6 and the rising conduit 7 forming a trap between the reservoir and an outlet from the gully of the upper conduit 5 (i.e., where the upper conduit leaves the housing). The trap prevents the escape of odours from the remainder of the drainage system (not shown). The housing 1 may be made, for example, of cast concrete or glass-filled polypropylene or polyethylene.

Conventionally, one or more courses of bricks 11 are provided on an upper edge of the housing 1 and are surmounted by a grill 13 to prevent large items entering the housing.

The housing is formed with a continuous inwardly-extending lip 15 around the region of the upper edge thereof so as to form an inlet opening 17, the lower surface of the lip providing a sealing surface. The lip may have a width of, for example, about 25 mm. A flap valve 19 is pivotable mounted along an edge thereof, for example by means of a suitable pivot pin 20 and is movable between first and second positions. The flap valve 19 is configured to close the opening 17 in the first position and is configured substantially not to obstruct the opening in the second position. To this end, in the second position the flap valve 19 is in a substantially vertical position and is received in a lateral recess 14 formed in a side of the housing 1. In the first position, a peripheral region of the flap valve 19 engages with the lower sealing surface of the lip 15 so as to prevent flow out of the opening 17 of the housing. The flap valve 19 may be made of a plastics material, such as acrylonitrile-butadiene-styrene (ABS) or polypropylene.

Figure 3:
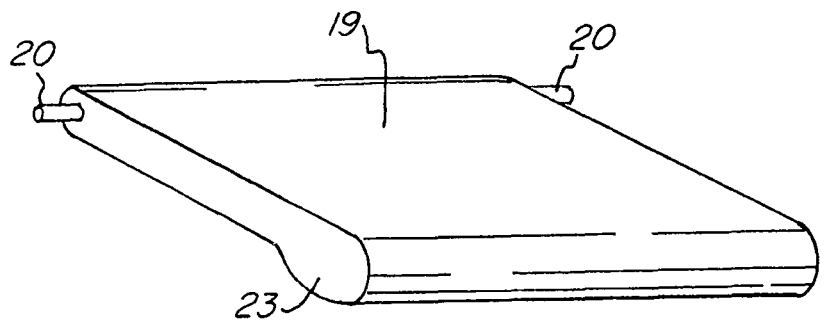
FIG. 3 is a perspective view from one side of a flap valve forming part of the gully shown in FIGS. 1 and 2.
Figure 4:
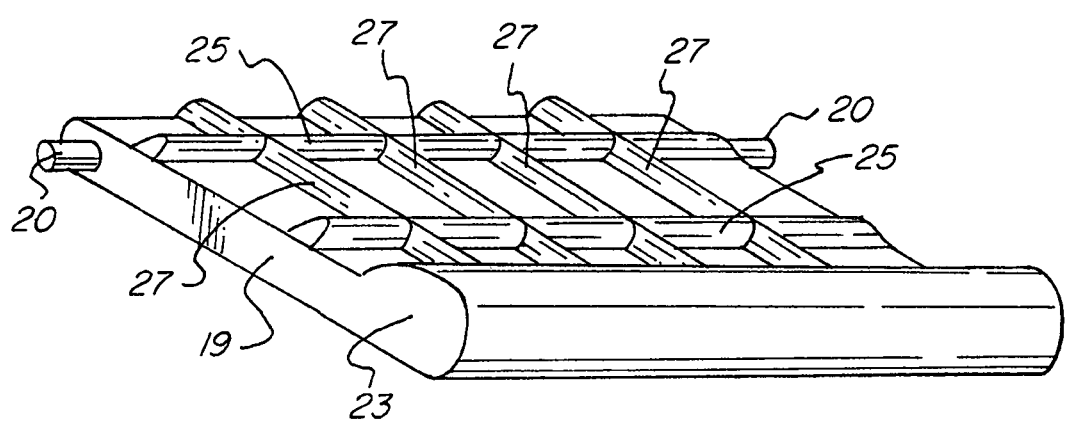
FIG. 4 is a perspective view from another side of the flap valve shown in FIG. 3.

The flap valve 19 has an overall specific gravity less than 1 such that it floats on the liquid as it rises within the housing 1. That is, the flap valve may be made of a material, such as a plastics material, having a specific gravity less than 1 and/or the flap valve may be provided with a float 23, for example along a free edge thereof, in order to cause the valve to rise as the liquid level within the housing rises. As shown in FIGS. 3 and 4, the flap valve may be provided with reinforcing ribs 25, 27, for example in two transverse directions in order to reinforce the valve and to reduce flexing thereof.

In use of the gully shown in FIGS. 1 and 2, under normal conditions the configuration of the gully is as shown in FIG. 1, that is, the flap valve 19 is pivoted downwardly and is received in the lateral recess formed in the side of the housing and there is free communication between the interior of the gully and the exterior. In this configuration, the trap prevents the escape of odours into the housing 1 from a sewer or the like of the drainage system to which the upper conduit is connected, which in turn would allow such odours to escape through opening 17 to the ambient atmosphere. When water enters the gully, the water level in the reservoir 3 rises and, if it reaches a certain level, will flow out of the gully and into a sewer or the like of the drainage system. However, under flood conditions the water level in the reservoir may rise above the outflow conduit 5 due to backflow into the gully from the sewer or the like of the drainage system. In this case, the flap valve 19 pivots upwardly with the rising water level until the valve contacts the sealing surface provided by the lip 15 around the opening 17 so as to prevent the flow of water our of the gully and into a road or the like.

Thus, in addition to water and/or untreated sewage being unable to escape to the surface through the gully according to the present invention, surface water will not be able enter the gully, and therefore the drainage system, until the flow within the sewer or the like of the drainage system has diminished sufficiently for the flap valve 19 to open. Such an arrangement is likely to reduce significantly the time taken for flood water to recede in addition to eliminating the risk of untreated sewage flowing out through the gully.

The invention claimed is:

1. A gully arrangement comprising: a housing having an inlet at an upper end thereof, a reservoir in a lower region thereof, and a conduit system forming a trap at a side of the housing; and a valve provided in an upper region of the housing and adapted to close the inlet in an event that liquid in the reservoir of the housing rises substantially to a level of the valve, wherein the conduit system comprises an upper outlet conduit communicating directly with the reservoir in the housing at a second level, below the inlet and providing both an upper exit directly from the reservoir and also an outlet from the housing, the upper exit from the reservoir being closed by a removable stopper, and a lower outlet conduit communicating directly with the reservoir in the housing and providing a lower exit directly from the reservoir of the housing at a lower level than the upper exit from the reservoir, and extending in an upwardly inclined direction to communicate with the upper outlet conduit intermediate the upper exit from the reservoir of the housing and the outlet of the upper outlet conduit from the housing, the removable stopper and the upwardly inclined lower outlet conduit forming the trap of the conduit system, between the reservoir and the outlet of the upper outlet conduit from the housing, for preventing an escape of odors into the housing reservoir from a drainage system in which the gully arrangement is installed.

2. A gully arrangement as claimed in claim 1, wherein the conduit system is provided in a lateral protrusion of the housing.

3. A gully arrangement as claimed in claim 1, wherein the upper outlet conduit extends in a downwardly inclined direction from the housing reservoir.

4. A gully arrangement as claimed in claim 1, where the housing is provided with a continuous inwardly-extending lip for sealing the valve.

5. A gully arrangement as claimed in claim 4, wherein the valve is adapted to seal with a lower surface of the lip.

6. A gully arrangement as claimed in claim 4, wherein a peripheral region of the valve sealingly engages the lip in a sealing relationship.

7. A gully arrangement as claimed in claim 1, wherein the valve comprises a flap valve pivotably mounted along one edge thereof.

8. A gully as claimed in claim 1, wherein the specific gravity of the valve is less than 1.

9. A gully arrangement as claimed in claim 8, wherein the valve is made of a material having a specific gravity less than 1.

10. A gully arrangement as claimed in claim 8, wherein the valve is provided with a float.

11. A gully arrangement as claimed in claim 10, wherein the valve is provided with the float along a free edge thereof.

12. A gully arrangement as claimed in claim 1, wherein the valve is provided with reinforcing ribs.

13. A gully arrangement as claimed in claim 12, wherein the reinforcing ribs extend in two transverse directions.

14. A gully arrangement as claimed in claim 1, wherein, in an open configuration of the inlet, the valve is received in a recess provided in a wall of the housing.

\* \* \* \* \*